United States Patent
Langley et al.

(10) Patent No.: US 11,030,892 B1
(45) Date of Patent: *Jun. 8, 2021

(54) METHOD AND SYSTEM FOR CAPTURING AND STORING SIGNIFICANT SURVEILLANCE IMAGES

(71) Applicant: FLOCK GROUP INC., Atlanta, GA (US)

(72) Inventors: Garrett Langley, Atlanta, GA (US); Matt Feury, Atlanta, GA (US)

(73) Assignee: FLOCK GROUP INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,871

(22) Filed: Feb. 10, 2020

Related U.S. Application Data

(63) Continuation of application No. 15/968,399, filed on May 1, 2018, now Pat. No. 10,559,200.

(51) Int. Cl.
| | |
|---|---|
| *G06F 1/3296* | (2019.01) |
| *G06N 3/04* | (2006.01) |
| *G08G 1/017* | (2006.01) |
| *G08G 1/01* | (2006.01) |
| *G06K 9/00* | (2006.01) |

(52) U.S. Cl.
CPC ......... *G08G 1/0175* (2013.01); *G06F 1/3296* (2013.01); *G06K 9/00771* (2013.01); *G06N 3/04* (2013.01); *G08G 1/0116* (2013.01); *G06K 2209/15* (2013.01)

(58) Field of Classification Search
CPC ............. G08G 1/0175; G06F 1/3296; G06K 9/00771; G06N 3/04
See application file for complete search history.

(56) References Cited

U.S. PATENT DOCUMENTS

| | | | |
|---|---|---|---|
| 757,996 A | 4/1904 | Davis | |
| 6,339,651 B1 * | 1/2002 | Tian | G06K 9/344 340/10.1 |
| 6,754,369 B1 * | 6/2004 | Sazawa | G06K 9/3266 382/105 |

(Continued)

OTHER PUBLICATIONS www.a2zsecuritycameras.com website; accessed Jan. 2018; four pages.
www.radiusvision.com website; accessed Jan. 2018; three pages.

*Primary Examiner* — Mainul Hasan
(74) *Attorney, Agent, or Firm* — Smith Tempel; Steven P. Wigmore

(57) ABSTRACT

A method and system for capturing and filtering surveillance images are described. A processor detects motion of an object in a field of view and then generates a plurality of images in response to detecting motion of the object in the field of view. A first filter is then applied to the plurality of images and later, the one or remaining images based on the first filter are stored in a memory device. In response to a triggering event, an energy conserving processor is activated from a sleep mode of operation where the energy conserving processor applies a second filter to the remaining images from the first filter. The energy conserving processor assigns a confidence score to one or more images matching the second filter. With the second filter, the energy conserving processor selects fewer images for RF transmission to a remote image analyzer, resulting in increased power savings.

20 Claims, 7 Drawing Sheets

(56) References Cited

U.S. PATENT DOCUMENTS

| | | | |
|---|---|---|---|
| 7,466,223 | B2 | 12/2008 | Sefton |
| 7,504,965 | B1 | 3/2009 | Windover et al. |
| 7,825,829 | B2 | 11/2010 | Madsen |
| 8,218,046 | B1 * | 7/2012 | Tashiro ............... H04N 5/35527 348/297 |
| 8,478,889 | B2 | 7/2013 | Bestgen et al. |
| 9,761,135 | B2 | 9/2017 | Chen et al. |
| 9,791,766 | B2 | 10/2017 | Ekin |
| 10,559,200 | B1 * | 2/2020 | Langley ................ G06K 9/2018 |
| 2008/0131001 | A1 * | 6/2008 | Hofman ................ G06K 9/3283 382/182 |
| 2010/0052947 | A1 | 3/2010 | Lin et al. |
| 2013/0215266 | A1 * | 8/2013 | Trundle ........... G08B 13/19602 348/143 |
| 2013/0266190 | A1 * | 10/2013 | Wang ................... G06K 9/3258 382/105 |
| 2014/0072177 | A1 | 3/2014 | Chou et al. |
| 2014/0146172 | A1 | 5/2014 | Kajitani et al. |
| 2014/0210646 | A1 | 7/2014 | Subramanya |
| 2014/0218527 | A1 | 8/2014 | Subramanya |
| 2014/0254879 | A1 | 9/2014 | Smith |
| 2016/0034477 | A1 | 2/2016 | Mao et al. |
| 2017/0110013 | A1 | 4/2017 | Frangiadakis et al. |
| 2017/0116792 | A1 * | 4/2017 | Jelinek .................... G07C 5/085 |
| 2017/0270384 | A1 * | 9/2017 | Wilbert .................... G06K 9/325 |
| 2017/0300786 | A1 * | 10/2017 | Gope ......................... G06T 5/20 |
| 2017/0357881 | A1 * | 12/2017 | Hoshino ................ G06K 9/325 |

\* cited by examiner

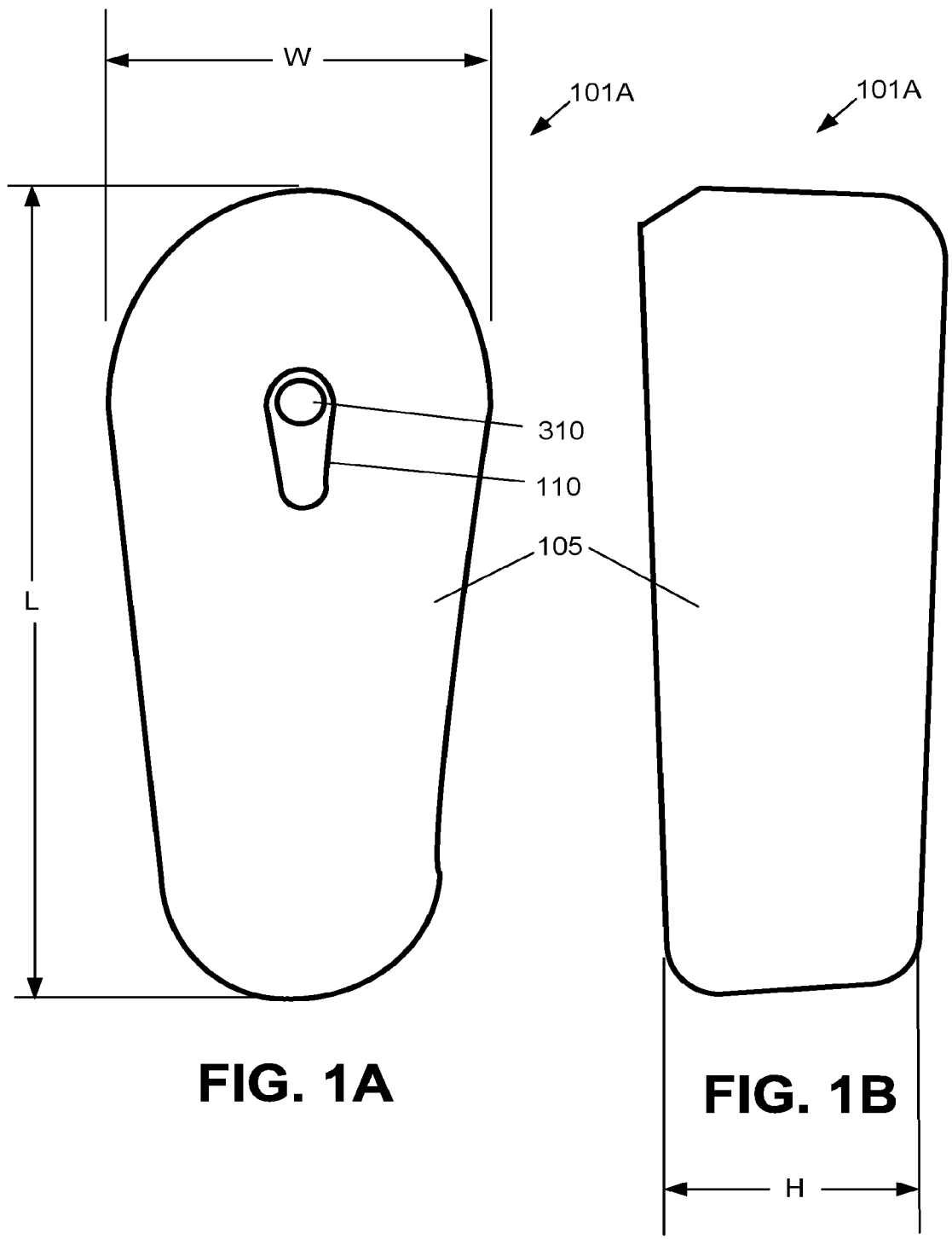
FIG. 1A   FIG. 1B

METHOD AND SYSTEM FOR CAPTURING AND STORING SIGNIFICANT SURVEILLANCE IMAGES

DESCRIPTION OF THE RELATED ART

Many different types of License Plate Recognition (LPR) cameras currently exist as of this writing. Usually these conventional LPR cameras are very large in size: they are mounted to a vehicle-towed trailer and often have numerous batteries to supply power where the battery-banks can weigh on the order of hundreds of pounds.

In addition to these large battery-banks, each conventional, trailer-mounted LPR camera may have one or more large solar panels which provide power in about the 70.0 to about 80.0 Watt range. Such conventional LPR cameras are usually provided with an image sensor having both a global shutter and a wide dynamic range. The conventional LPR camera usually does not have significant intelligence with respect to analyzing images taken because it is designed to take an enormous amount of images such that all of the images can be analyzed by a computer server that is remotely located relative to the LPR camera.

LPR cameras are often used by law enforcement personnel in order to identify and track automobiles who may be associated with operators who commit traffic violations. LPR cameras are also used by law enforcement personnel to identify and track automobiles of operators who may be wanted criminals or operators who may be conspiring to commit future crime(s).

Each conventional LPR camera is usually provided with significant hardware for enhancing the images taken by the LPR camera. The hardware may provide a high dynamic range as well as a wide dynamic range such that the hardware may eliminate noise from images. Such noise in images may comprise brightness or darkness present in a digital image. Each conventional LPR camera also consumes a significant amount of memory since all digital images taken by the LPR camera are stored and then transmitted to another computer for later processing.

With this conventional design, a trailer-mounted LPR camera is very bulky (i.e. very large) and hence, it is very expensive to manufacture. A trailer-mounted LPR camera may have a starting price of $50,000 U.S. dollars and can easily approach $100,000 U.S. dollars as of this writing. With respect to keeping/retaining digital images, a conventional LPR camera is not very intelligent: it is designed to generate and capture hundreds of thousands of images and store all of them for later processing. The conventional LPR camera is not designed to be selective with respect to its digital image capture.

What is needed in the art are smaller and more efficient LPR cameras that can be mounted to existing structures and which are selective with respect to what digital images are stored locally in the camera and eventually sent remotely for additional processing. What is needed in the art are intelligent LPR cameras which can conduct local processing of digital images so that not every image generated or taken is stored in the camera and transmitted for remote processing. What is further needed in the art are small and efficient LPR cameras that do not consume that much power, but also provide substantial intelligence for determining which images are significant with respect to surveillance.

SUMMARY OF THE INVENTION

A method and system for capturing and filtering surveillance images are described. The method and system include a processor for detecting motion of an object in a field of view and then generating a plurality of images in response to detecting motion of the object in the field of view. The object may comprise a vehicle having a license plate.

A first filter is then applied to the plurality of images and later, the one or remaining images based on the first filter are stored in a memory device. In response to a triggering event, an energy conserving processor is activated from a sleep mode of operation where the energy conserving processor applies a second filter to the remaining images from the first filter. This second filter may comprise one that is based on a neural network algorithm. The energy conserving processor assigns a confidence score to one or more images matching the second filter.

The energy conserving processor designates the one or more images matching the second filter for transmission over a computer network. The transmission usually includes a wireless transmission of the images over a cellular telephone network.

The first filter may comprise a difference comparison among the plurality of images. Meanwhile, the second filter as noted above, comprises a filtering algorithm based on a neural network.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 1A is a front view of an exemplary camera system according to one exemplary embodiment of the invention;

FIG. 1B is a side view of the exemplary camera system illustrated in FIG. 1A according to one exemplary embodiment;

DETAILED DESCRIPTION OF EXEMPLARY EMBODIMENTS

Figure 1C:
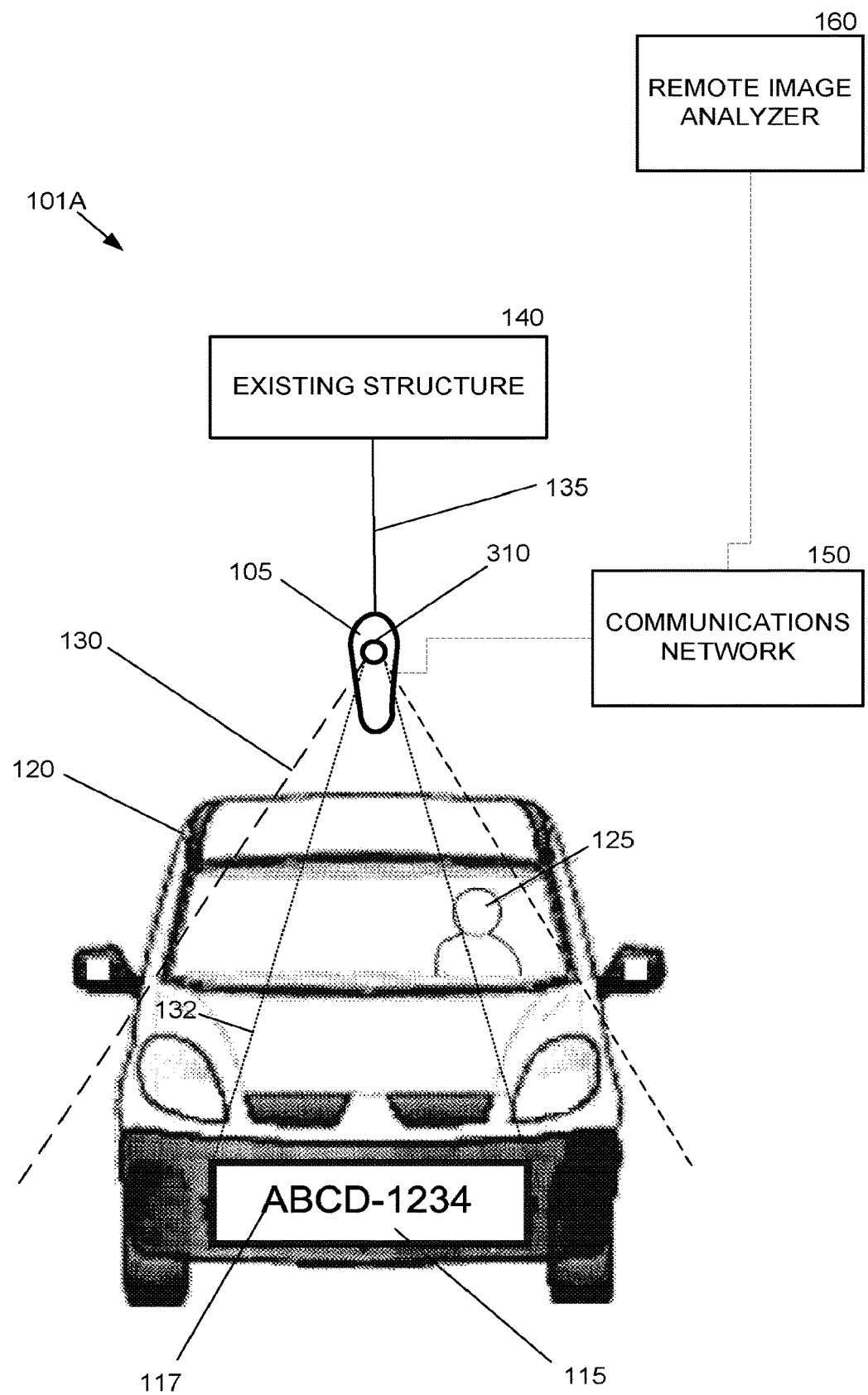
FIG. 1C is another view of an exemplary camera system which illustrates a communications network and a remote server for processing images captured by a camera in the camera system.

The term "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

Individual image frames contain "content" which is whatever was captured by the image whether it be a human, an animal, a vehicle, a tree, an empty parking lot, etc. In this description, an "identifiable" object is any object within a video frame or frame composite for which all relevant features are detected and are independent from all other features detected from other partially or wholly identifiable objects. An object is "readable" if a symbology associated with an identified object may be accurately decoded or interpreted.

In this description, two identifiable and readable objects captured in separate images may be considered equivalent, and thus the same object, if an object similarity probability calculation exceeds a given threshold. Depending on embodiment, such a probability calculation may consider the statistical significance of similarity among the objects' respective fingerprints, relative locations, object neighborhood, etc.

In this description, the terms "surveillance device," "portable recording device" and "video surveillance cameras" and the like are used interchangeably unless indicated otherwise. Examples of these devices may be, but are not limited to being a smartphone, a navigation device, a tablet personal computer ("PC"), a camera system, a commercial security system, a home security system, a traffic monitoring system, or a hand-held computer with a wireless connection or link.

In this description, the term "neural network" refers to an algorithmic system customized to identify objects and/or aspects of identified objects in a manner modeled after human cognitive processing. As would be understood by one of ordinary skill in the art, neural networks "learn" (i.e. progressively improve performance on) tasks by considering examples, generally without task-specific programming.

For example, embodiments of the solution seeking to identify objects recognized in an image frame might leverage neural networks that learn to identify images that contain automobiles by analyzing example images that have been manually labeled as "automobile" or "no automobile" and using the results to identify automobiles in other images. Advantageously, embodiments of the solution may take a positive output from one neural network as an input to another, more specialized neural network in order to further and more precisely identify the object in an image frame.

For example, embodiments of the solution may take a positive identification of an automobile and input the image into a neural network that has learned to identify color by analyzing example images that have been manually labeled as "blue" or "not blue", etc. and using the results to identify the color of objects in other images. In this way, embodiments of the solution may leverage a logical cascade of neural networks to identify an object in an image frame captured by a surveillance camera, determine the class of the object (e.g., it's an automobile), and determine aspects of the object (e.g., it's a blue, 2009 Ford Taurus with a single occupant).

As used in this description, the terms "component," "database," "module," "system," "engine", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer.

By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Referring now to the drawings, wherein the showings are for purposes of illustrating certain exemplary embodiments of the present disclosure only, and not for purposes of limiting the same, FIG. 1A is a front view of an exemplary camera system 101A according to one exemplary embodiment of the invention. The camera system 101A may comprise a housing 105. The housing 105 as illustrated in FIG. 1A may comprise an elongated elliptical shape according to one exemplary embodiment. However, other geometries for the housing 105 are possible and are included within the scope of this disclosure. Other geometries for the housing 105 include, but are not limited to, oval, square, rectangular, triangular, etc.

The housing 105 may have a length dimension L, a width dimension W, and a height dimension H (see FIG. 1B). The length dimension L may comprise a length of about 8.0 inches while the width dimension W may comprise a width of about 4.0 inches. The height dimension H may comprise a height of about 3.0 inches. However, other dimensions, especially for different shapes of the housing 105 as noted above, are possible and are included within the scope of this disclosure.

The housing 105 may comprise an aperture 110. The aperture 110 may comprise glass or a plastic cover which is transparent. The aperture 110 may be designed to receive a lens 310 of a camera module 305 (see FIG. 2) which may help capture images facing this side of the housing 105.

Referring now to FIG. 1B, this figure is a side view of the exemplary camera system 101A illustrated in FIG. 1A according to one exemplary embodiment. As noted previously, the height dimension H may have a magnitude of about 2.0 inches. However, other magnitudes larger or smaller are possible for dimension H and are included within the scope of this disclosure.

FIG. 1C is another view of an exemplary camera system 101A which illustrates a communications network 150 and a remote image analyzer 160 for processing images captured by a camera in the camera system. Specifically, the camera system 101A may comprise the camera housing 105 for protecting its hardware (See FIG. 2) and/or software and the system 101A may further comprise the communications network 150. The communications network 150 may be coupled to the remote image analyzer 160. The communications network 150 may comprise a wide area network ("WAN"), the plain-old-telephone-system ("POTS"), a local area network ("LAN"), the Internet, or any combination of these and other types of networks.

The lens 310 of the camera system 101A may have a first field of view 130 for the images it captures. The first field of view 130 may have a magnitude between about 60.0 degrees to 80.0 degrees, and preferably about 70.0 degrees. However, other magnitudes for the first field of view 130 are possible and are within the scope of this disclosure. The camera system 101A may also have illuminating infrared light emitting diodes (LEDs) 245 (See FIG. 2) that generate a second field of view 132 within the first field of 130.

The illuminating infrared LEDs 245 may generate the second field of view 132 in order to illuminate reflective objects such as license plates. The illuminating infrared LEDs 245 are often used by the camera system 102 when image capturing conditions may not be ideal, such as during darkness and during inclement weather (i.e. during rain, snow, etc.) when visibility is poor.

The second field of view 132 produced by the illuminating infrared LEDs 245 generally has a magnitude which is less than the first field of view 130. The second field of view 132 may have a magnitude between about 5.0 degrees to about 15.0 degrees, and preferably about 10.0 degrees. However, other magnitudes for the second field of view 132 are possible and are within the scope of this disclosure as understood by one of ordinary skill in the art. The distance or range for the illuminating infrared LEDs 245 may comprise a magnitude between about zero to about 300.0 feet, and usually between zero and about 250.0 feet.

The lens 310 may help capture images of a vehicle 120 that may have a license plate 115 having license plate data 117. According to the exemplary embodiment illustrated in FIG. 1C, the vehicle 120 may comprise a van but other vehicles 120 are possible and are included within the scope of this disclosure. Other vehicles 120 include, but are not limited to, automobiles, trucks, motorcycles, bicycles, trains, planes, helicopters, etc. The license plate data 117 may comprise data such as numbers, letters, colors, symbols, graphical elements, and/or any combination thereof. According to the exemplary embodiment of FIG. 1C, the license plate data 117 comprises the data of, "ABCD-1234" as its combination of letters and numbers.

The camera housing 105 may be coupled to an existing structure 140 by a fastening mechanism 135. The existing structure 140 can be any man-made object such as a utility post or utility tower, like a telephone pole, electrical pole, a water tower, a lamp post, etc. The existing structure 140 may also comprise a building or a bridge. The existing structure 140 may also comprise any nature-based object, such as a natural occurring structure like a tree, a cliff, or a hill. The fastening mechanism 135 may comprise one or any combination of fastening devices such as, but not limited to, nuts, bolts, screws, rivets, nails, and/or chemical-based adhesives.

The remote image analyzer 160 may comprise one or more computer servers and/or databases. It should be understood that the term "server" as used in this description may refer to a single server system or multiple systems or multiple servers. One of ordinary skill in the art will appreciate that various server arrangements may be selected depending upon computer architecture design constraints and without departing from the scope of the invention.

The remote image analyzer 160 may review the uploaded images transmitted from the camera system 101A for license plate data. The remote image analyzer 160 may compare the license plate data 117 to other data in its database as well as sending the license plate data to other databases. The remote image analyzer 160 may generate one or more alerts and/or reports based on the license plate data 117 from the uploaded images and any matches that it makes during its machine-based comparisons. The alerts and/or reports may comprise one or more images of license plate data 117 taken from the images as well as optical character recognition data based on the license plate data 117 in addition to, and not limited to, date, time, and camera location associated with the license plate data which was captured.

Figure 2:
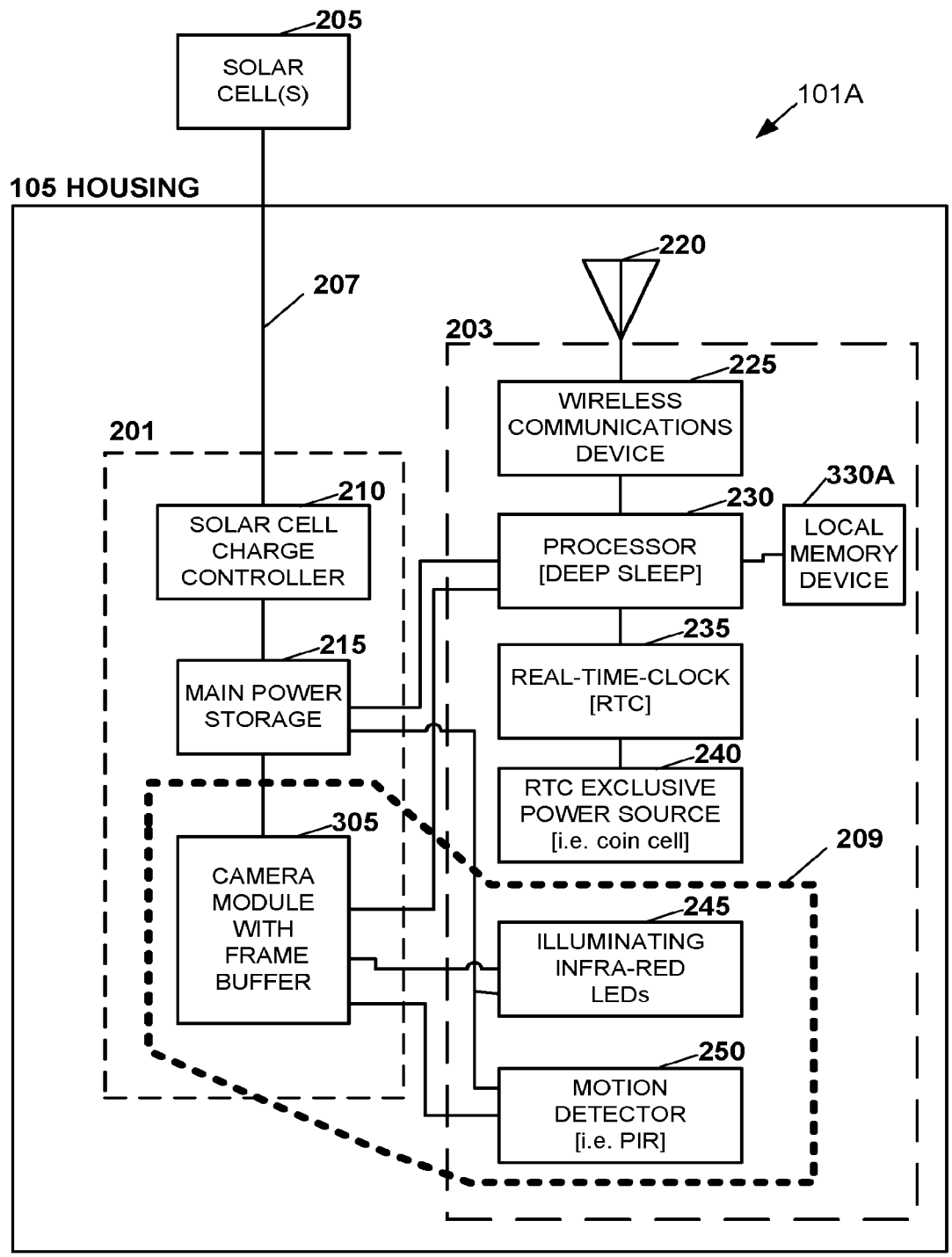
FIG. 2 is a functional block diagram of the hardware and/or software contained within one exemplary embodiment of the camera system.

Referring now to FIG. 2, this figure is a functional block diagram of the hardware and/or software for one exemplary embodiment of the camera system 102A. The camera system 102A may comprise solar cells 205, a solar cell charge controller 210, a main power storage 215, a camera module with frame buffer 305, an antenna 220, a wireless communications device 225, a processor, a real-time-clock (RTC) 235, a RTC exclusive power source 240, the illuminating infrared LEDs 245 (described previously), and a motion detector 250.

The solar cell charge controller 210, main power storage 215, and camera module with frame buffer 305 are highlighted with a dashed rectangular box 201 to indicate that these elements may reside on the same printed circuit board. Similarly, the wireless communications device 225, the processor 230, the local memory device 330A, the real-time clock 235, RTC exclusive power source 240, illuminating infrared LEDs 245, and motion detector 250 are highlighted with different rectangular box 203 to indicate that these elements may reside on a single printed circuit board (PCB). However, other electronic packaging layouts/physical configurations are possible and are included within the scope of this disclosure.

The solar cells 205 may be coupled to the solar cell charge controller 210 via a cable 207. The solar cells are usually not mounted to the housing 105 itself, but can be mounted to an existing structure 140 described above. The solar cells 205 may comprise photovoltaic solar cells for converting sunlight into electrical current. The solar cells 205 may be designed to produce approximately between about 15.0 Watts to about 40.0 Watts of power based on traffic activity and/or solar conditions.

The solar cell charge controller 210 may comprise a processor for managing the storage of the electricity produced by the solar cells 205. The solar cell charge controller 210 may be coupled to the main power storage 215. The solar cell charge controller 210 may intelligently manage the main power storage 215 by monitoring its total power capacity and making sure that the main power storage 215 does not receive energy that exceeds it total power capacity (i.e. such as electrical current when the main power storage 215 comprises a re-chargeable battery).

The main power storage 215 may comprise one or more re-chargeable batteries. According to one exemplary embodiment the main power storage 215 may comprise re-chargeable, lithium-ion batteries. However, other battery types are possible and are within the scope of this disclosure. The main power storage 215 may supply of voltage between about 11.0 Volts to about 13.0 Volts, and preferably about 12.0 Volts of electrical power. While the exemplary embodiment of the camera system 101A illustrated in FIG. 2 is designed for generating its own power through solar energy, other energy sources may be provided in addition to solar energy or as an alternative to solar energy. Other energy sources include wind power, hydro-power, as well as a power line from an electrical grid.

The main power storage 215 may be coupled to the camera module 305, the motion detector 250, the illuminating infrared LEDs 245, and to the processor 230 for supplying power to these elements. The camera module 305, the motion detector 250, and illuminating infrared LEDs 245 have been enclosed by box 209 to illustrate that these three elements work together while the main processor 230 is sleeping or in its stand-by/low power mode.

The camera module 305 has the lens 310 (described above in connection with FIGS. 1A-1C) which helps in generating and capturing the images of the license plate 115 described above in connection with FIG. 1C. Further details of the camera module 305 will be described below in connection with FIG. 3.

The main power storage 215 may supply power to the processor 230 when it is woken from a deep sleep cycle. The main power storage 215 may also supply power to the motion detector 250. The motion detector 250 is responsible for detecting objects 120 within the field of view 130 (See FIG. 1C) produced by the lens 310 and then triggering the camera module 305 to take several pictures/images of the detected object 120.

The motion detector 250 may comprise a passive infrared (PIR) sensor. The motion detector may detect PIR light in the range between about 850.0 nanometers and 960.0 nanometers. The motion detector 250 senses heat fluctuations caused by moving objects 120. In other exemplary embodiments, the motion detector 250 may comprise a microwave, ultrasonic, or tomographic sensors or any combination thereof.

The motion detector 250 triggers the camera module 305 to take one or more pictures/images of an object 120 that has been detected. The camera module 305 usually takes several images of the detected object 120 which is within the field of view 130. The camera module 305 may turn on the illuminating infrared LEDs 245 if the time of day [i.e. lighting conditions] and/or weather conditions [i.e. rain, snow, etc.] were determined by the remote image analyzer 160 and sent to the processor 230. The process 230, when it wakes from its sleep cycle, may send to the camera module 305 control information/conditions for illuminating/activating infrared LEDs 245.

While the camera module 305 is taking one or more images of detected objects 120 within its field of view 130, the processor 230 may be in a deep sleep cycle. As noted previously, at least one advantage of the inventive camera system 101 is that it can operate with very low power. And to accomplish this objective of low power, the processor 230 is designed to enter into multiple deep sleep cycles throughout the operation of the system 101 such that the processor 230 consumes very little power while it is in its sleep cycle.

When the processor 230 is woken from its deep sleep cycle, it is designed to review the images captured by the camera module 305 and to determine if the images 305 are significant or noteworthy enough to upload over the computer communications network 150 to the remote image analyzer 160 (See FIG. 1C). This intelligent screening/filtering of images by the processor 230 is yet another advantage of the inventive camera system 101A.

Specifically, when processor 230 wakes and reviews the captured images, it will also make note of the "quality" of the images, including but not limited to brightness, blurriness, etc. The processor 230 may use well known techniques to determine these quality values. If the images are not of sufficient quality, the processor 230 will send a message containing a recommended adjustment of camera settings that is recorded in the camera module's memory device 330B. This settings message created by the processor 230 may include, but is not limited to, the following: the current time as kept by the RTC 235; if the camera module 305 turn on the infrared illuminating LEDs 245 when capturing images for the current conditions; what shutter speed should be used; and what ISO to use when capturing images.

This intelligent screening/filtering by the processor 230 may comprise the processor 230 applying a neural network based algorithm, and specifically, a recurrent convolutional neural network (RCNN) or a you-look-only-once (YOLO) neural network algorithm. The neural network algorithms may be applied by the processor 230 in order to detect objects 120 within the images and to assign confidence scores to objects 120 (i.e. rank objects) that are detected. Further details of the processor 230 applying a neural network algorithm will be described below in connection with FIGS. 5 and 6.

The processor 230 may execute the neural network algorithms in software and/or hardware. The software containing the neural network algorithms may be stored in a local memory device 330A and/or a memory device 330B associated with the camera module 305 (See FIG. 3). The memory devices 330 may comprise flash memory, double-data rate (DDR) memory, and/or any types of non-volatile memory. However, volatile memory types may be employed without departing from this disclosure. Additionally, a combination of volatile and non-volatile memory types may also be employed as understood by one of ordinary skill in the art.

With this intelligent screening and/or filtering of images by the processor 230, the processor 230 is selective for which images are uploaded to the remote image analyzer 160. And when the processor 230 is selective for the images which are captured, this reduces the amount of images which are uploaded to the remote image analyzer 160. Therefore, this reduction of the transmission of images over the communications network 150 significantly reduces power consumption of the entire camera system 101A because the wireless communications device 225 is activated only minimally.

As one illustration of the power savings provided by the inventive camera system 101A, the camera module 305 may consume about 10.0 milliamps of power when it is capturing images of an object 120. Meanwhile, during a powering-up segment for the processor 230, the processor 230 while it is reviewing images taken and stored in the camera module 305 may consume about 100.0 milliamps of power.

When the processor 230 has filtered the images captured by the camera module 305 and is ready to transmit the images which have survived the filter, then the wireless communications device 225 in combination with the antenna 220 may consume about 400.0 milliamps of power per transmission. Thus, with the processor 230 reducing the number of images transmitted to the remote image analyzer 160, it may significantly reduce the amount of power consumed by the system 101A by only operating the wireless communications device 225 only minimally.

The processor 230 may be coupled to the wireless communications device 225 and to a real-time-clock 235. The wireless communications device 230 may comprise a radio-frequency transceiver with a modem for communicating with a cellular telephone network. Other wireless communications devices 230 besides radio-frequency (RF) types may be employed without departing from the scope of this disclosure. Other wireless communications devices 230 include, but are not limited to, acoustic communication devices, optical/infrared based communications devices, and electromagnetic induction type communication devices.

In addition to the wireless communication device 230, the processor 230 may be coupled to a real-time-clock 235. The real-time-clock 235 provides the processor 230 with the time of day, day of month, and year for the processor 230. The RTC 235 is employed such that the processor 230 may enter into a deep sleep cycle so that it is not dependent on its own internal clock(s) which may become idle and/or unused during a sleep cycle. The RTC 235 may also provide its time data to the camera module 305 [via the processor 230] so that the camera module 305 may date stamp each of the images that it captures for objects 120.

The RTC 235 may be coupled to an exclusive power source 240 which is designed to supply energy only to the RTC 235. According to one exemplary embodiment, the RTC exclusive power source 240 may comprise a battery. For example, the battery may be a coin-sized battery cell. The battery may supply power to the RTC 235 on the order of years, such as between 5.0 and 10.0 years.

As noted previously, the illuminating infrared light emitting diodes (LEDs) 245 may generate a second field of view 132 within the first field of view 130 (See FIG. 1C). The illuminating infrared LEDs 245, as described above, may generate the second field of view 132 within the first field of view 130 in order to illuminate reflective objects 120 that include license plates 115. The illuminating infrared LEDs 245 are often used by the camera system 101 when image conditions may not be ideal, such as during darkness and/or during inclement weather (i.e. during rain, snow, etc.) when visibility is poor.

The second field of view 132 produced by the illuminating infrared LEDs 245 generally has a magnitude which is less than the first field of view 130. The second field of view 132 may have a magnitude between about 5.0 degrees to about 15.0 degrees, and preferably about 10.0 degrees. However, other magnitudes for the second field of view 132 are possible and are within the scope of this disclosure as understood by one of ordinary skill in the art. The distance or range for the illuminating infrared LEDs 245 may comprise a magnitude between about zero to about 300.0 feet, and usually between zero and about 250.0 feet.

Figure 3:
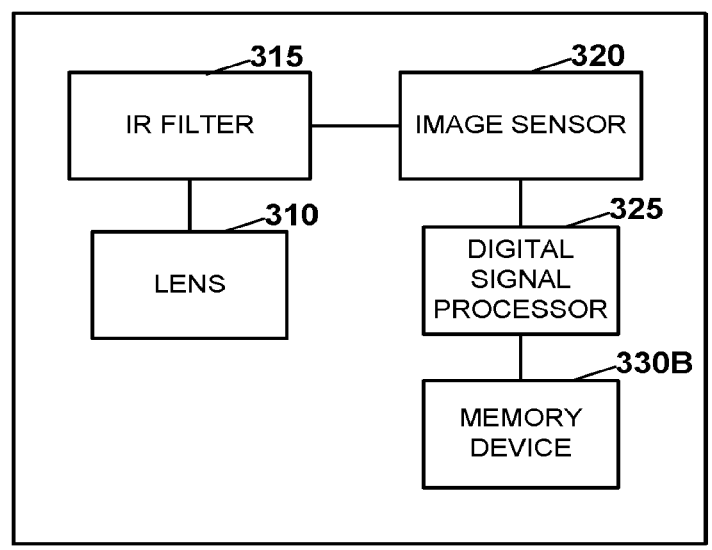
FIG. 3 is a functional block diagram of one exemplary embodiment of a camera module that is one component of the exemplary camera system of FIG. 2.

Referring now to FIG. 3, this figure is a functional block diagram of one exemplary embodiment of a camera module 305 that is one component of the exemplary camera system of FIG. 2. The camera module 305 may comprise a lens, a filter 315, an image sensor 320, a digital signal processor 325, and a memory device 330B. As noted previously, the memory device 330B may comprise a DDR type memory device. However, other memory devices 330 are possible and are within the scope of the disclosure.

The lens 310 creates a visual focus and the first field of view 130 (See FIG. 1C) for the image sensor 320. The filter 315 may comprise an infrared (IR) filter for removing/filtering an infrared light received in the image. As noted previously, the camera module 305 and/or processor 230 may activate one or more illuminating infrared LEDs 245 for bouncing infrared light off a detected object 120 within the second field of view 132. Such activation of the illuminating infrared LEDs 245 may be helpful when image capturing conditions are not ideal (i.e. during inclement weather such as during rain or snow and/or when the time of day is at night and there is very little or no natural light to illuminate any detected objects 120).

Also, as noted above, most license plates 115 as of this writing are designed to be very reflective in response to infrared light in order to enhance digital image capture of license plates 115. The filter 315 allows the camera module 305 to capture full color images during the daytime. The DSP 325 may keep the filter 315 "off" at nighttime so that it can pass through any infrared light generated by illuminating infrared LEDs 245, i.e. so that the reflection of a license plate 115 generated by the infrared light is more visible in the captured image.

The image sensor 320 may comprise a semiconductor charge-coupled device (CCD), a complementary metal-oxide-semiconductor (CMOS), or N-type metal-oxide-semiconductor (NMOS, Live MOS) type of sensor. The image sensor 320 may be coupled to a digital signal processor (DSP) 325. Alternatively, a field gate programmable array (FPGA) may be employed instead of the DSP 325. The DSP 325 may adjust any one of the numerous settings for the image sensor 320. Exemplary settings for the image sensor 320 may include, but are not limited to, exposure [light meter]; aperture; shutter speed; ISO [exposure index rating]; white balance; amount of infrared light provided by the illuminating infrared LEDs 245; and depth of field.

The DSP 325 may retrieve and store the digital images produced by the image sensor 320 in the memory device 330B. Like the main processor 230 described above, the DSP 325 may also perform some filtering of the images generated by the image sensor 320. The DSP 325 may filter images by removing duplicate images that do not show significant differences between one image to the next. Specifically, the DSP 325 may remove/delete duplicate images of an object 120 when multiple images present very similar information/views of the same object 120. The DSP 325 may compare multiple images taken of a single object 120 and reduce the number of images taken if the differences from one image to the next in a series of images are not that different.

For example, for a plurality of images, let's suppose ten images, which capture a moving object 120 translating at least 10.0 feet across the field of view 130, the DSP 325 may delete several images such as the second, third, fourth, sixth, seventh, eighth, and ninth images. And thereby, the DSP 325 saves or keeps the first, fifth, and tenth images of the previously ten-image set. In other words, the DSP 325 has reduced a ten image set to a three image set comprising the first, fifth, and tenth images. This reduction of images by the DSP 325 further reduces the image set uploaded to the remote image analyzer which is in addition to the reduction made by the processor 230 employing the neural network algorithm discussed above.

The DSP 325 may store its filtered images in the memory device 330B. As noted previously, the memory device 330B may comprise a DDR type memory device. However, other memory devices 330 are possible and are within the scope of the disclosure. The memory device 330B may have a size which ranges between about 16.0 megabits to about 2.0 gigabytes. The size of the memory device 330B may be selected based on an intended application of the camera system 101.

Figure 4:
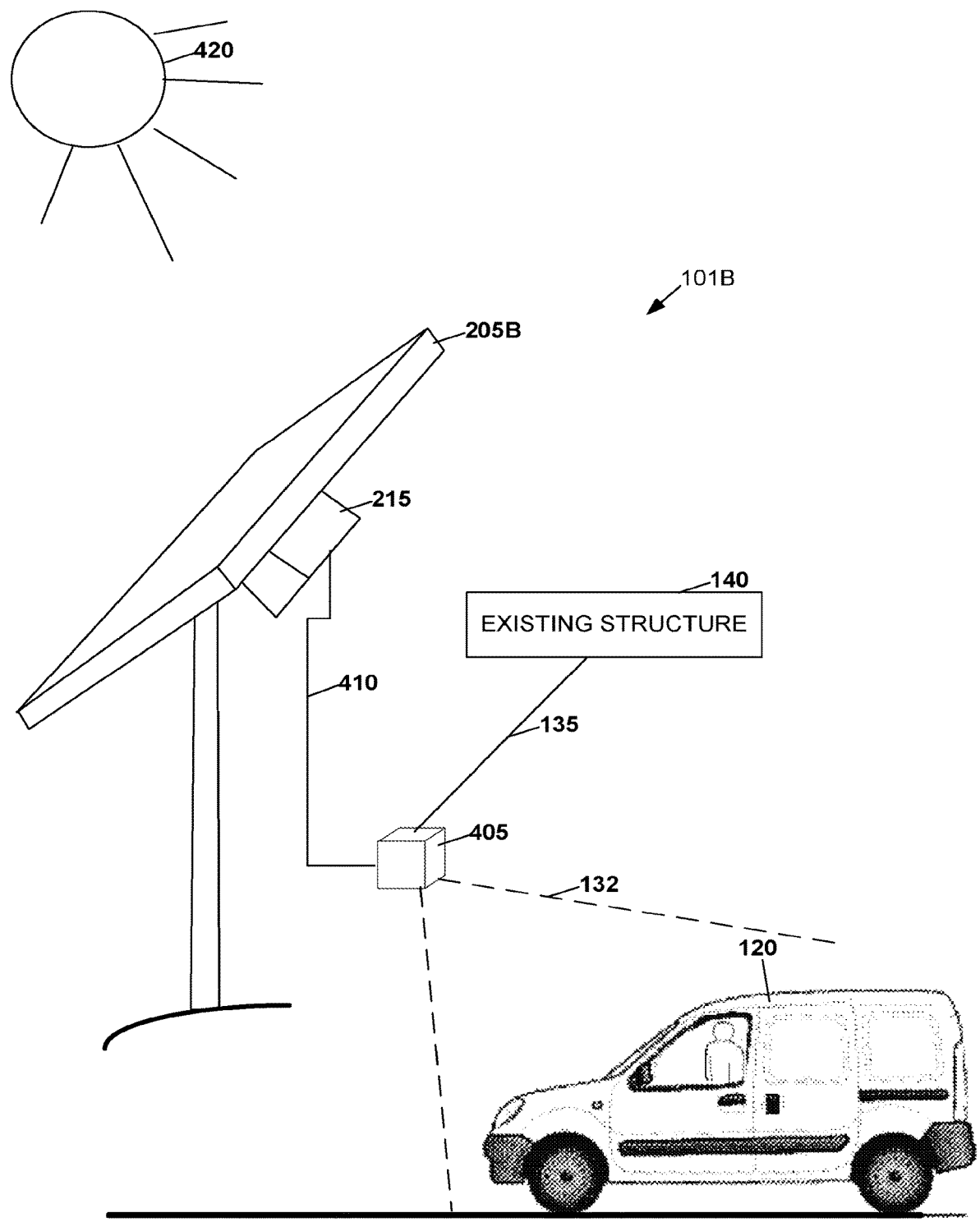
FIG. 4 is another exemplary embodiment of the camera system.

Referring now to FIG. 4, this figure illustrates another exemplary embodiment of the camera system 101B. According to this exemplary embodiment of the camera system 101B, the solar cells 205B and main power storage 215 form a separate physical structure/module relative to the camera sub-system 405. The solar cells 205B may be oriented at an ideal angle for maximizing receiving sunlight from the sun 420.

The camera sub-system 405 may have its own housing which protects several of the hardware elements that are similar to the ones illustrated in FIG. 2. The camera subsystem 405 may be coupled to the main power storage 215 by a wire 410. The camera sub-system 405 may be supported by an existing structure 140 via a fastening mechanism 135.

As noted previously, the existing structure 140 can be any man-made object such as a utility post or utility tower, like a telephone pole, electrical pole, a water tower, a lamp post, etc. The existing structure 140 may also comprise a building or a bridge. The existing structure 140 may also comprise any nature-based object, such as a natural occurring structure like a tree, a cliff, or a hill. The fastening mechanism 135 may comprise one or any combination of fastening devices such as, but not limited to, nuts, bolts, screws, rivets, nails, and/or chemical-based adhesives. The camera subsystem 405 may produce a field of view 132 which can capture images of objects 120 which may comprise one or more vehicles.

Figure 5:
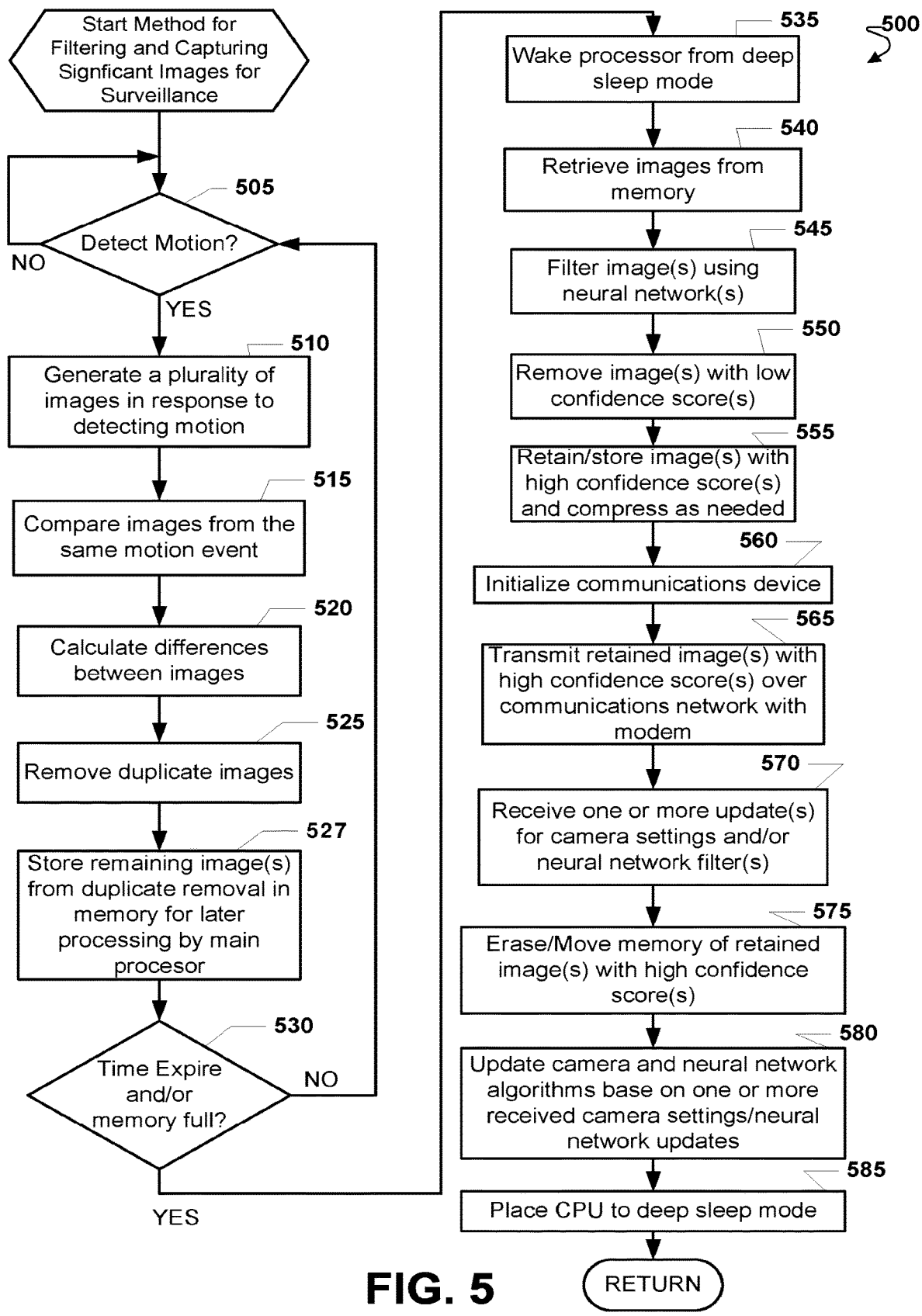
FIG. 5 is a logical flow chart for an exemplary method 500 for capturing and filtering images by the camera system 101 illustrated in FIGS. 1-4.

FIG. 5 is a logical flow chart for an exemplary method 500 for capturing and filtering images by the camera system 101 illustrated in FIGS. 1-4. Decision Step 505 is the first step of the process 500 in which the motion detector 250 detects if there has been any movement within the field of view 130 produced by the camera system 101. If the inquiry to decision step 505 is negative, meaning that no motion has been detected by the motion detector 250, then the method 500 follows the "No" branch and returns to the beginning of step 505.

If the inquiry to decision step 505 is positive, meaning that the motion detector 250 has sensed some movement in the field of view 130, then the "Yes" branch is followed to step 510. In step 510, a plurality of digital images are produced by the image sensor 320 and are transferred by the DSP 325 to the memory device 330B.

Next, in step 515, after all images have been captured for the motion event, the DSP 525 compares the images taken for the motion event. In step 520, the DSP 525 calculates any differences between the images taken for the motion event based on the comparisons made in step 515. In step 525, the DSP may remove duplicate images of the same object 120. As noted previously, the DSP 325 may remove/delete duplicate images of an object 120 when multiple images present/show very similar information/views of the same object 120. The DSP 325 may compare multiple images taken of a single object 120 and reduce the number of images taken if the differences from one image to the next in a series of images are not that different.

For example, for a plurality of images, let's suppose ten images, which capture a moving object 120 translating at least 10.0 feet across the field of view 130, the DSP 325 may delete several images such as the second, third, fourth, sixth, seventh, eighth, and ninth images. And thereby, the DSP 325 saves or keeps the first, fifth, and tenth images of the previously ten-image set. In other words, the DSP 325 has reduced a ten image set to a three image set comprising the first, fifth, and tenth images. This reduction of images by the DSP 325 further reduces the image set uploaded to the remote image analyzer which is in addition to the reduction made by the processor 230 employing the neural network algorithm which will be in step 545 (described below).

In step 527, the DSP 325 may store the remaining image(s) of the object(s) from the duplicate removal sub-process in the memory device 330B for later processing/filtering by the main processor 230. Next, in decision step 530, it is determined if the memory device 330B has reached its capacity for storing images of objects 120 and/or if a predetermined period/threshold of time has expired.

As noted previously, the memory device 330B may have a size which is selectable and/or based on its application/intended environment. If the memory device 330B is sized to capture about fifty to a hundred images, then decision step 530 can be based on the maximum capacity of the memory device 330B because fifty to one-hundred images may be easily managed by the processor 230 while maintaining the power savings described above.

However, if the memory device 330B is sized to retain on the order of thousands or hundreds of thousands of images of object(s) (i.e. having a capacity in the 1.0 to 2.0 Gigabyte range or above), then setting decision step 530 to activate for the maximum capacity of the memory device 330B is not feasible since thousands or hundreds of thousands of images of objects(s) would be too taxing on the processor 230 if power savings is an objective. When the memory device 330B is sized with such a large capacity, then decision step 530/triggering event can be based on a fraction or ratio of capacity filled for the memory device 330B.

Alternatively, or in addition to the memory capacity triggering event described above in connection with the memory device 330B, decision step 530 can be programmed to activate after certain periods/lengths of time have expired. For example, exemplary time periods may comprise time periods on the order of five minute, ten minute, fifteen minute, thirty minute, forty-five minute, and hour intervals. Other timing thresholds are possible and are within the scope of this disclosure as understood by one of ordinary skill in the art.

The memory capacity triggering event and/or timing triggering event of decision step 530 may be monitored by the DSP 325. Once the DSP 325 senses the positive condition for decision step 530, the DSP 325 may send a wake signal to the main processor 230 as will be described below.

If the inquiry to decision step 530 is negative, meaning that the DSP 325 has detected that the time period set for decision step 530 has not expired and/or that the memory device 330B has not reached capacity (or a ratio thereof), then the "No" branch is followed back to decision step 505. If the inquiry to decision step 530 is positive, meaning that the DSP 325 has detected that either the time period has expired and/or the memory device 330B has reached its capacity (or designated ratio thereof), then the "Yes" branch is followed to step 535 in which the DSP 325 sends a wake signal to the main processor 230 to "wake-up" from its deep sleep cycle/low-power mode.

Next, in step 540, the processor 230 retrieves the image(s) of the object(s) from the memory device 330B. Subsequently, in step 545, the processor 230 filters the images using a neural network based algorithm, and specifically, a recurrent convolutional neural network (RCNN) or a you-look-only-once (YOLO) neural network algorithm. The neural network algorithms may be applied by the processor 230 in order to detect objects 120 within the images and to assign confidence scores to objects 120 (i.e. rank objects) that are detected Specifically, the neural network is trained for object detection, a technique in which an image is inputted. And then a series of calculations occurs, and a list of predictions are outputted. These predictions may include the class name, i.e. what the object is, a confidence percentage, and a list of coordinates detailing a bounding box of where the object is located/positioned in the image. The specific sequence of calculations performed on the captured image (known as the "graph") can include but is not limited to popular graphs such as Faster-RCNN and YOLO, as noted above. The specific values to use in the calculations (known as the "weights") are determined by training the desired graph with the remote image analyzer 160 (see FIG. 1C) using a substantial dataset of images. Such a dataset may also be acquired from open source datasets such as COCO or ImageNet and/or using images uploaded to the Remote Image Analyzer 160.

Next, in step 550, the processor 230 removes/deletes images from the memory device 330B which have low confidence scores based on the neural network filtering of step 545. Alternatively, instead of removing/deleting the low confidence score images, the processor 230 may set a flag/designate low confidence score images for retention only and not for uploading. This means that the processor 230 may keep all images in the memory device 330B but only designate certain ones, images with high confidence scores based on the neural network filtering, for uploading over the communications network 150 to the remote image analyzer 160.

Subsequently, in step 555, the processor 230 may retain/store those images with high confidence scores in the memory device 330B. The processor 230 may also compress some or all of the retained images having high confidence scores. The processor may also keep uncompressed images with high confidence scores in memory device 330B. Alternatively, if all images are retained by the processor 230, in this step 555, the processor 230 may designate/turn-on a flag for each high confidence image (and compressed) for uploading to the remote image analyze 160.

In step 560, the processor 230 may power-up/activate the wireless communications device 225 which may comprise an RF modem. Next, in step 565, the processor 230 using the communications device 225 may transmit the retained/designated high-confidence score image(s) over the communications network 150 to the remote image analyzer 160.

Subsequently, in step 570, the processor 230 may receive updates for camera settings and/or updates from the remote image analyzer 160 for the neural network filters (i.e. adjusted weighting for each RCNN) of the camera system 101. The camera settings may comprise anyone of the camera settings discussed above, such as, but not limited to, exposure [light meter]; aperture; shutter speed; ISO [exposure index rating]; white balance; amount of infrared light provided by the illuminating infrared LEDs 245; and depth of field.

The camera settings received by the processor 230 in this step 570 may be generated by the remote image analyzer 160 after it has reviewed several of images uploaded by the camera system 101. The remote image analyzer 160 may determine optimal camera settings for the camera system 101 based on time of day and based on time of year (i.e. what day of the month to account for amounts of sunlight and weather conditions based on time of year—spring, summer, fall, winter).

The remote image analyzer 160 may also determine improved and optimal weightings for the neural network diagrams/algorithms executed by the processor 230. The remote image analyzer 160 may have its own RCNN neural network algorithms and it may determine improved weightings based on comparisons of images taken by the camera system over periods of time (i.e. after days, weeks, months, and years).

As discussed above, the remote image analyzer 160 may also generate one or more alerts and/or reports based on the license plate data 117 from the uploaded images and any matches that it makes during its machine-based comparisons. The alerts and/or reports may comprise one or more images of license plate data 117 taken from the images as well as optical character recognition data based on the license plate data 117 in addition to, and not limited to, date, time, and camera location associated with the license plate data which was captured.

Next, in step 575, the processor 230 may erase the images with the high confidence scores in order to conserve memory. Alternatively, the processor 230 may change a flag status of the images with the high confidence scores so they are stored in a different part of the memory device 330B and/or for certain period of time. If the processor 230 generates compressed images having high confidence scores as well as uncompressed versions, then in this step 575 the processor could delete/erase the compressed versions while retaining the uncompressed versions for a certain period of time (i.e. for a week, month, or several months).

Subsequently, in step 580, the processor 230 may transmit the updated camera settings to the image sensor 320 and update its neural network algorithms, and specifically its weightings such as for RCNNs, stored in its local memory device 330A based on the weighting updates the processor 230 received from the remote image analyzer 160 in step 570. Next, in step 585, the processor 230 is then placed in its deep sleep cycle/low power mode. The method or process 500 then returns.

Figure 6:
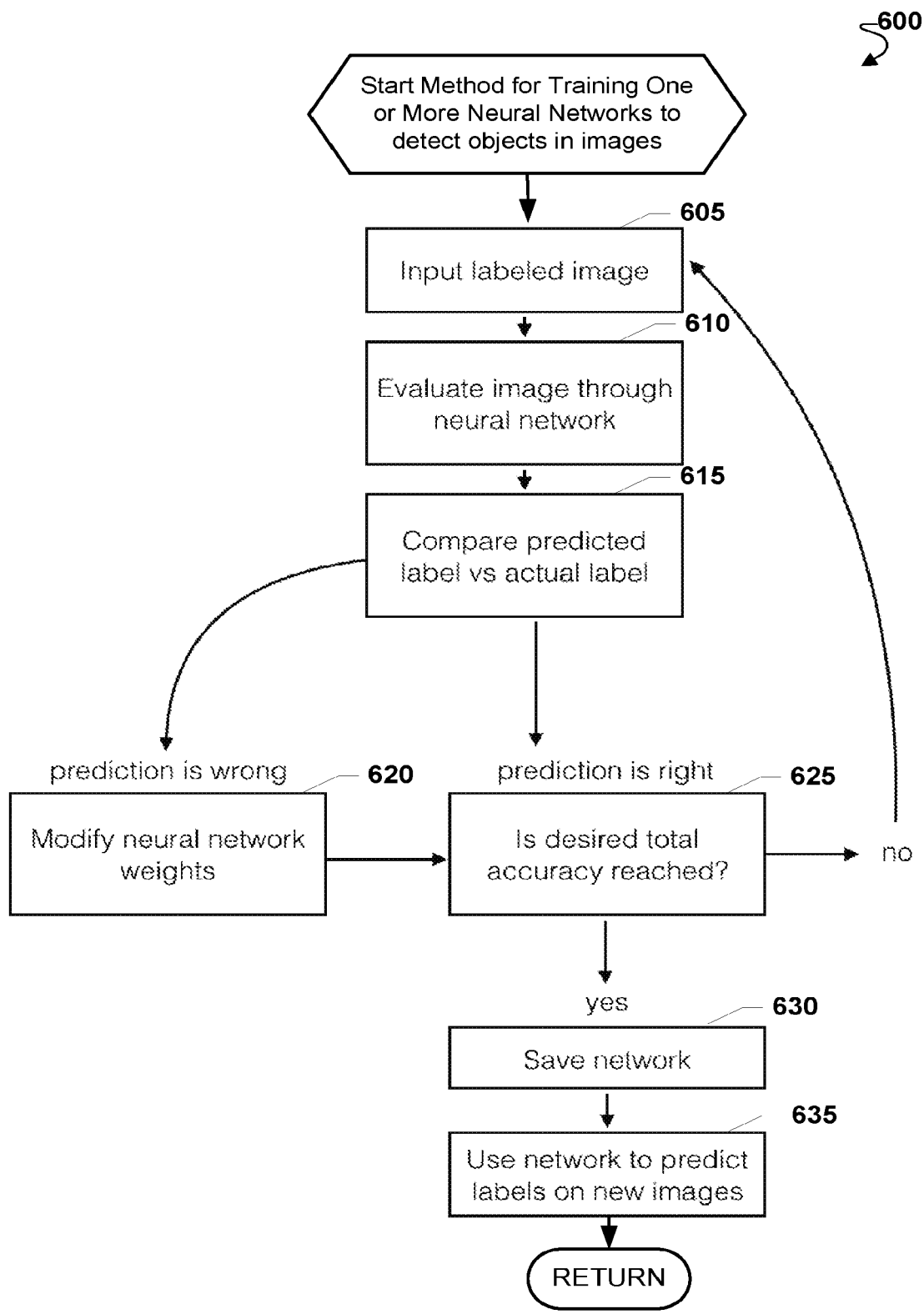
FIG. 6 is a logical flow chart for a method 600 that trains a neural network to detect objects in images.

Referring now to FIG. 6, this figure is a logical flow chart for a method 600 for training a neural network to detect objects in images. This method is usually performed by the remote image analyzer 160. Once the method is complete, the remote image analyzer 160 may send the calculated weights for the one or more neural networks [acting as filter(s)] to the processor 230 of the camera system 101.

One goal of the machine-based object detection method 600 as illustrated in FIG. 6 is to be able to input an image (Step 605) and output a label of the objects in that image (e.g. car, dog, etc.) (Step 635). A common technique for creating an object detection system is to train one or more convolutional neural networks via machine learning, where the model's accuracy is improved by being provided examples of correct results.

To accomplish this, a dataset must first be compiled with example images where the objects in the image are labeled prior to training (Step 605). All objects that are desired to be detected must be known and incorporated into the model and example data beforehand. Many existing datasets are available for use, such as COCO and Open Images; otherwise, one may label his/her own images. For training, it is recommended to have at least 50,000 images of each object to be detected.

With this dataset in hand, a convolutional neural network may be trained to learn how to correctly detect objects in an image. As understood by one of ordinary skill in the art, a neural network usually includes a graph of matrix operations where some matrices have adjustable variables (i.e. weights). One goal of the training process is to be able to adjust these weights so that certain input values (i.e. images) result in certain output values (i.e. correct labels). Existing network architectures exist, such as Faster RCNN and YOLO, and are at least two preferred architectures as of this writing.

The training process for a neural network may include inputting labeled images into a network (Step 605), evaluating the image through the neural network (Step 610), and comparing the predicted label generated by the neural network with the actual label (label made prior to training) (Decision Step 615).

If there is a difference between the expected and actual values (i.e. loss) as calculated in decision Step 615—where the prediction is wrong/off—the method goes to step 620. If there is no difference between the expected and actual value (i.e. no loss), then the method proceeds to Step 625.

In Step 620, the difference between the expected and actual values is calculated and applied to the matrix weights of the neural network such that the loss is reduced for the next iteration of Step 615, improving the accuracy of the neural network. After Step 620, in decision step 625, it is determined if a desired total accuracy of the neural network has been achieved.

If the inquiry to decision Step 625 is positive—meaning that the desired accuracy was achieved in Step 615, then the "Yes" branch is followed to Step 630. If the inquiry to decision Step 625 is negative—meaning that the desired total accuracy based on the comparison in Step 615 has not been achieved, then the "No" branch is followed back to Step 605 wherein the next training image in the training dataset is inputted into the neural network. In Step 630, the network matrix weights are saved. In step 635, the saved network matrix weights may be used to predict labels for objects 146 (i.e. license plates, cars, people, etc.) in new images (not from the training dataset).

This process is then repeated (returned to Step 605) across the entire dataset until the weights begin to converge. A neural network with converged weights provides consistent accuracy across the entire dataset, yielding an object detection model in which you can input a new image and detect the objects in that image with an expected accuracy. Once the neural network achieves a desired, selected accuracy, the remote image analyzer may transmit the saved network matrix weights over the communications network 150 to the camera system 101 so that the one or more neural networks stored within the camera system 101 may be updated.

For a specific neural network training example, see a journal article entitled, "Faster R-CNN: Towards Real-Time Object Detection with Region Proposal Networks," authored by Shaoqing Ren et al. found in the electronic Publication eprint arXiv:1506.01497 and published in June 2015. Particularly, see FIG. 2 of that journal article. One could take the architecture of this neural network of FIG. 2 and implement it in a neural network modeling library such as TensorFlow. Each layer in this FIG. 2 takes an input from the previous layer, does some manipulation of the data, and outputs the new value to the following layer. The specific type of manipulation done depends on the attributes and type of the layer.

For instance, a convolutional layer of a specific size is a set of weights that is convolved across the entire image, producing an activation map for a specific feature across the image. For example, one convolutional layer could be trained to recognize a tire, and one could be trained to recognize a license plate. A subsequent layer may then look at the output of these initial layers and learn that when these features are present, so is a car.

The technique known as back-propagation may be used in order for the system to find the particular weights of a particular feature. In this technique, the layer is convolved across an image, producing a matrix that acts like a heat map, indicating where it believes a specific feature to be located within the image. The system then takes this output and compares it with the expected value (as indicated by the labeled training dataset), and adjusts the weights based on the difference between the expected and the actual output. By using a neural network architecture such as illustrated in FIG. 2 of the aforementioned published journal article along with the technique of back-propagation machine learning, the network is able to learn to identify specific features and their location within an image.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or parallel (substantially simultaneously with) other steps without departing from the scope and spirit of the invention. Further, words such and "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification.

Therefore, disclosure of a particular set of program code instructions or detailed hardware devices is not considered necessary for an adequate understanding of how to make and use the invention. The inventive functionality of the claimed computer implemented process is explained in more detail in the above description and in conjunction with the figures that may illustrate various processes flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM, Flash, or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, Server, or other remote source, such as in "cloud" computing, using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk, and blu-ray disc where disks usually reproduce data magnetically, while discs reproduce data optically with lasers. Combinations of the above should also be included within the scope or computer-readable media.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A computer-implemented method for capturing and filtering surveillance images, wherein a processor performs the function of:
   detecting object motion in a field of view;
   generating multiple images based on the detected object motion;
   creating a reduced set of images by applying a first filter, wherein the reduction is carried out by removing duplicate images after comparing images captured by the prior detection of motion of the object;
   storing the reduced set of images;
   determining whether an energy conserving processor needs to be woken up based on one of two conditions, one of which is a predetermined amount of time and the other one of which is an amount of storage capacity for the reduced set of images;
   wherein the energy conserving processor upon activation applies a second filter to the previously reduced set of images and assigns a confidence score based on the matching of one or more images to the second filter; and
   transmitting the one or more images matching the second filter over a computer network.

2. The computer-implemented method of claim 1, wherein the first filter comprises a difference comparison among the plurality of images.

3. The computer-implemented method of claim 1, wherein the second filter comprises a filtering algorithm based on a neural network.

4. The computer-implemented method of claim 1, further comprising the energy conserving processor transmitting the one or more images matching the second filter over a cellular telephone network.

5. The computer-implemented method of claim 1, wherein the object comprises a vehicle.

6. The computer-implemented method of claim 5, wherein the vehicle has a license plate.

7. The computer-implemented method of claim 1, wherein the one or more images matching the second filter are transmitted over the computer network to a remote image analyzer.

8. The computer-implemented method of claim 7, wherein the remote image analyzer determines one or more image settings based on the one or more images matching the second filter.

9. The computer-implemented method of claim 3, wherein the remote image analyzer determines one or more updates for weightings used in the neural network.

10. A computer-implemented system for capturing and filtering surveillance images, the computer-implemented system comprising:
    means for detecting an object motion in a field of view;
    means for generating multiple images based on the detected object motion;
    means for creating a reduced set of images by applying a first filter, wherein the reduction is carried out by removing duplicate images after comparing images captured by the prior detection of motion of the object;
    means for storing the reduced set of images;
    means for determining whether an energy conserving processor needs to be woken up based on one of two conditions, one of which is a predetermined amount of time and the other one of which is an amount of storage capacity for the reduced set of images;
    wherein the energy conserving processor upon activation applies a second filter to the previously reduced set of images and assigns a confidence score based on the matching of one or more images to the second filter; and transmits the one or more images matching the second filter over a computer network.

11. The computer-implemented system of claim 10, wherein the first filter comprises a difference comparison among the plurality of images.

12. The computer-implemented system of claim 10, wherein the second filter comprises a filtering algorithm based on a neural network.

13. The computer-implemented system of claim 10, wherein the energy conserving processor transmits the one or more images matching the second filter over a cellular telephone network.

14. The computer-implemented system of claim 10, wherein the object comprises a vehicle.

15. The computer-implemented system of claim 14, wherein the vehicle has a license plate.

16. A system for capturing and filtering surveillance images, the system comprising:
    a device for detecting an object motion in a field of view;
    a camera module for generating multiple images based on the detected object motion, and for creating a reduced set of images by applying a first filter, wherein the reduction is carried out by removing duplicate images after comparing images captured by the prior detection of motion of the object;
    a memory device for storing the reduced set of images;
    a logic module determining whether an energy conserving processor needs to be woken up based on one of two conditions, one of which is a predetermined amount of time and the other one of which is an amount of storage capacity for the reduced set of images;
    wherein the energy conserving processor upon activation applies a second filter to the previously reduced set of images and assigns a confidence score based on the matching of one or more images to the second filter; and transmitting the one or more images matching the second filter over a computer network.

17. The system of claim 16, wherein the first filter comprises a difference comparison among the plurality of images.

18. The system of claim 16, wherein the second filter comprises a filtering algorithm based on a neural network.

19. The system of claim 16, wherein the energy conserving processor transmits the one or more images matching the second filter over a cellular telephone network.

20. The system of claim 16, wherein the logic module comprises a digital signal processor.

* * * * *